(12) United States Patent
Novel

(10) Patent No.: US 6,205,332 B1
(45) Date of Patent: Mar. 20, 2001

(54) TELECOMMUNICATIONS SYSTEM ACROSS NATIONAL BORDERS

(76) Inventor: Gordon Novel, 565 Central Ave., Suite 209, Jefferson, LA (US) 70121

( * ) Notice: Subject to any disclaimer, the term of this patent is extended or adjusted under 35 U.S.C. 154(b) by 0 days.

(21) Appl. No.: 09/140,547

(22) Filed: Aug. 26, 1998

(51) Int. Cl.[7] .................................................... H04Q 7/20
(52) U.S. Cl. ........................ 455/426; 455/420; 455/427; 455/460
(58) Field of Search ............................ 45/426, 418, 419, 45/420, 445, 458, 460, 88, 31.3

(56) References Cited

U.S. PATENT DOCUMENTS

| | | |
|---|---|---|
| 4,713,837 | 12/1987 | Gordon . |
| 4,811,379 | 3/1989 | Grandfield . |
| 4,905,273 | 2/1990 | Gordon et al. . |
| 4,922,518 | 5/1990 | Gordon et al. . |
| 4,926,460 | 5/1990 | Gutman et al. . |
| 5,109,220 | 4/1992 | Breeden et al. . |
| 5,144,648 | 9/1992 | Bhagat et al. . |
| 5,737,707 | * 4/1998 | Gaulke et al. ........................ 455/556 |
| 5,974,300 | * 10/1999 | LaPorta et al. ...................... 455/31.2 |

FOREIGN PATENT DOCUMENTS

WO 88/0683    9/1988  (WO) .

* cited by examiner

*Primary Examiner*—Lee Nguyen
(74) *Attorney, Agent, or Firm*—Banner & Witcoff, Ltd.

(57) ABSTRACT

A telecommunications system for providing telecommunication services across national borders to a plurality of system subscribers. The system includes an operations center for receiving incoming requests for communications with a selected subscriber and a network interface for coupling the operations center to a digital data network for sending and receiving data signals. Satellite up and down links couple the operations center to a plurality of earth based broadcast stations for broadcasting control signals to portable communication terminals adapted to be carried by subscribers of the system. The control signals are used to activate the terminals to automatically connect to the operations center via the digital data network in order to conduct a communications session.

5 Claims, 2 Drawing Sheets

TELECOMMUNICATIONS SYSTEM ACROSS NATIONAL BORDERS

BACKGROUND OF THE INVENTION

The present invention generally relates to the field of telecommunications and more particularly, is directed to a mobile telecomputing device which can automatically receive, transmit and relay telecommunications information and data.

SUMMARY OF THE INVENTION

The telecommunications system for the present invention makes it possible to cause the automatic unattended receipt of E-MAIL, facsimile, telex, telegrams, voice mail and two-way voice communications. The system includes a telecomputer device which is portable and operates from battery power or from an A/C power line when one is available.

The telecomputer has an electronic microprocessor circuit board that directly interfaces a numeric or alphanumeric paging radio receiver system having a port for downloading data and which is removable or non-removable from a portable computer that also internally contains a cellular telephone.

Specially coded control signals relayed through the pager by way of the interface microprocessor circuit board may be used to activate or turn on the electrically dormant or unpowered standby computer, data modem, facsimile modem, wireline modem, and cellular telephone transceiver sections of the telecomputer, thereby making it possible through special function control programming to cause the cellular telephone to automatically dial a local or (800) national or international telephone number. This number's phone system is connected to a data distribution center that upon receiving the pager induced looped call from the portable telecomputer's internal cellular transceiver, automatically transfers back to the portable machine's computer data storage section, an electronic data message such as E-MAIL, file archives, group level-3 facsimiles, telefax, telegram or when attended, voice mail or two-way voice calls.

The information received by the telecomputer can be stored on an electromagnetic storage medium such as tape, drum, floppy disc, hard disk drive, optical laser disc or other retention medium. The information may also be stored in volatile or non-volatile memory elements. In addition, the telecomputer can also be programmed to verify for the central paging mainframe computer the receipt of a high priority numeric or alphanumeric pager message. The device then shuts off all other systems of the telecomputer except the paging function while alerting the user by appropriate external audible or visual signal as to what is occurring.

DESCRIPTION OF THE PREFERRED EMBODIMENT

Figure 1:
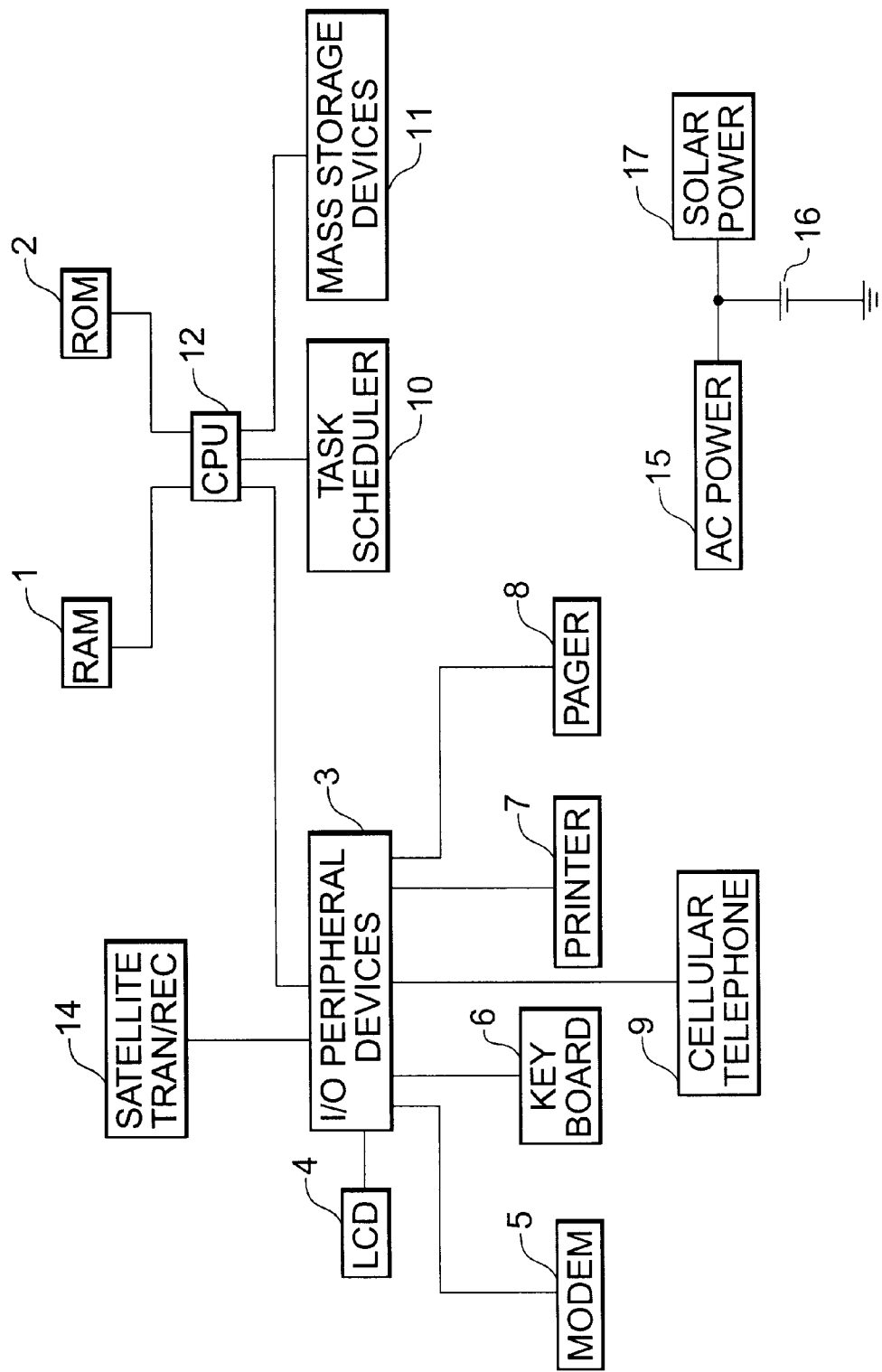
FIG. 1 is a block diagram illustrating the telecomputer device used in the present invention.

FIG. 1 is a block diagram illustrating the basic construction of the telecomputer which forms an integral part of the communications system of the present invention.

As FIG. 1 shows, the telecomputer includes a number of interrelated elements such as RAM memory 1 and ROM memory 2 where instructions and temporary data storage areas of a computer program reside. The telecomputer also includes input/output (I/O) peripherals devices 3 which allow the system to communicate with the user and with the outside world through such devices as LCD screen 4, telephone modem 5, keyboard 6, printer 7, electronic pager 8 and cellular telephone 9. The telecomputer further includes mass storage devices 11 which allow the system to store data to and receive programming instructions from such peripheral devices as magnetic floppy disks, optical and tape units and CD-ROM storage devices.

The heart of the telecomputer is central processing unit (CPU) 12 which supervises the flow of information between the various elements of the telecomputer and which perform logic calculations and other functions based on instructions in the computer program. CPU 12 may also integrally include RAM and/or ROM storage devices. A task scheduler 10 also is connected to CPU 12. As further described below, task scheduler 10 helps CPU 12 supervise the flow of information between CPU 12 and other elements of the telecomputer of Applicants' invention.

CPU 12 uses the concept of "time sharing" wherein a number of computer programs, or routines within an overall program, reside in memory at the same time and seemingly run simultaneously. Some programs and routines may also reside in mass storage devices and be read into and out of memory when needed in an overlay fashion. Each program or routine is referred to as a task or job and though it may appear to the causal observer that the CPU is continuously devoting its full attention to the task being performed for the user. In actuality, each task receives only a fraction of the CUP's time before the CPU moves on to other tasks.

A facility known as an "interrupt" allows the execution of the CPU to be interrupted periodically based on requests for service from internal or external devices or based on the passage of a certain amount of time. When an interrupt occurs and depending on its priority with respect to other interrupts and the task currently being performed by the CPU, the CPU stores information about the task it was performing when the interrupt occurred and then executes another task determined by the nature of the interrupt. The stored information allows the CPU to resume execution of the task which was interrupted once it has finished performing the task required by the interrupt. The CPU may also execute other tasks required by other higher priority interrupts before returning to the original task.

Means must be provided for selecting the task which will be executed by the CPU and means for deciding how long the CPU will execute the tasks before reassigning the CPU to another task. Task scheduler 10 performs this function. The operation of task scheduler 10 is itself supervised by CPU 12.

Tasks performed by CPU 12 can be divided into the following three categories based on the criticality or priority of the timeliness of the CPU's response to events related to the task:

1. "Real-time" tasks where the essence of the CPU function is to provide a rapid response to external events. An example of this type of task is the guidance control program for a missile. If the CPU is unable to provide a rapid response to course deviations or changing fuel weight, the missile will go off course.
2. "Interactive" task where a delay in response is inconvenient and inefficient but is not disastrous. An example of this type of task is a computer program which provides information about a customer's account status to a bank teller. If the computer is unable to provide a rapid response, the teller's time will be wasted and a waiting customer will be annoyed, but the bank will suffer no major adverse consequences.

3. "Background" tasks where response time to external events is not important. An example of this type of task is a program to print bank accounts summary statement at the end of the month.

All of the above types of task exist in the telecomputer of Applicants' invention and are supervised by task scheduler 10.

With reference again to FIG. 1, the telecomputer of Applicants' invention is powered by AC power 15 when available or by battery 16. Power may also be provided by solar power 17 which also can be used to maintain battery 16 in a charged state. The telecomputer also includes a satellite transmitter/receiver 14 for sending and receiving radio signals from a satellite as discussed below.

The elements illustrated in FIG. 1 may be generally selected from among prior art devices known to those of ordinary skill in the art.

Figure 2:
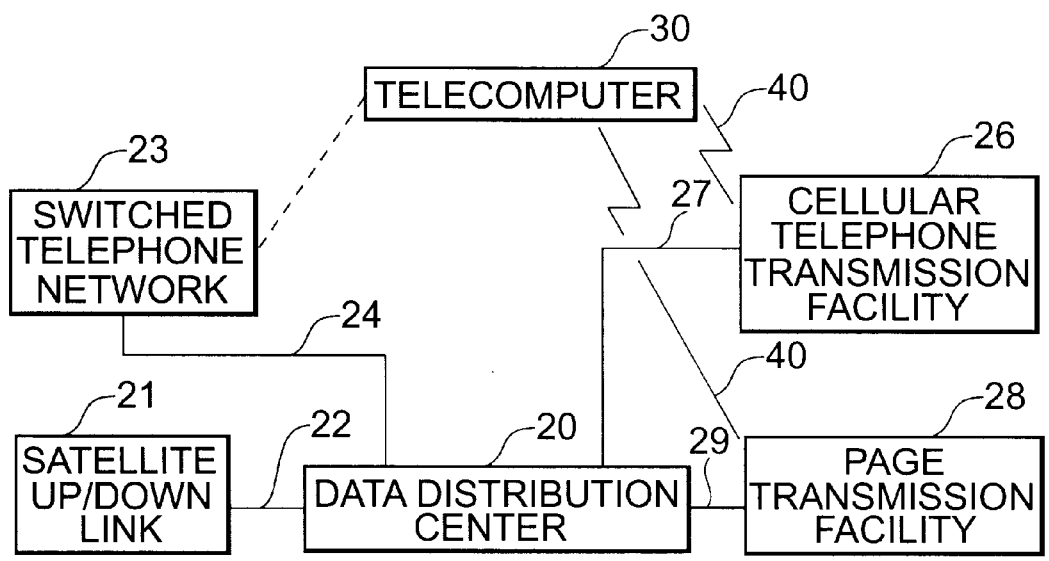
FIG. 2 is a block diagram illustrating the overall construction of the mobile telecommunications system in accordance with the present invention.

With reference to FIG. 2, there is illustrated an overall block diagram of the mobile communications system of Applicants' invention. The system includes data distribution center 20 which receives communication information from various sources for processing and routing. The communication information may include, telegram and telex data, E-MAIL and voice mail message data, paging data, facsimile data and control signal information.

Data distribution center 20 may be formed of a main frame computer and include many of the elements illustrated in FIG. 1 with respect to the telecomputer of Applicants' invention.

Data distribution center 20 is coupled to global satellite up/down link 21 by communication path 22. Up/down link 21 includes satellite transmission and receiving equipment for transmitting the communication information up to an orbiting satellite for relay to telecomputer 30 as shown in FIG. 2. Up/down link 21 also includes information from the satellite which originates form telecomputer 30. Up/down link 21 may also include signal processing and formatting equipment in order to maximize the efficiency of the transfer of the communications information between the satellite and data distribution center 20.

Data distribution center 20 also is coupled to commercial switched telephone network 23, cellular telephone transmission facility 26 and pager transmission facility 28 by communication paths 24, 27 and 29. Facilities 26 and 28 may be used to transfer the communication information between telecomputer 30 and data distribution center 20 using a radio signal 40. The communication information also may be transferred between telecomputer 30 and data distribution center 20 via switched telephone network 23.

Communication paths 22, 24, 27 and 29 may be a part of the commercial switched telephone network using wire or fiber optic conductors or may be formed of a microwave link as is known in the art.

In accordance with the present invention, specially coded control signals may be relayed from data distribution center 20 via pager transmission facility 28 to telecomputer 30 to activate or turn on the electrically dormant or unpowered CPU 12, modem 5 for facsimile, data and voice telephone and cellular telephone 9 of telecomputer 30, thereby making it possible through special function control programming to cause cellular telephone 9 to automatically dial a local or (800) national or international telephone number. This number's phone system is connected to a data distribution center 20 from switched telephone network 23. Upon receiving the pager induced looped call from the telecomputer's internal cellular telephone 9, data distribution center 20 automatically transfers back to the telecomputer's data storage section (mass storage devices 11, e.g.), any electronic data messages such as E-MAIL, file achieves, group level-3 facsimiles, telex, telegram or when attended, voice mail or two-way voice calls that are bing held in data distribution center 20.

In addition, telecomputer 30 may also be programmed to verify for data distribution center 20 the receipt of a high priority numeric or alphanumeric pager message. Telecomputer 30 may then shut off all other systems of the telecomputer except the paging function while alerting the user by appropriate external audible or visual signal as to what is occurring.

In accordance with the present invention, a user of telecomputer 30 may originate communication information in the form of a voice telephone signal, for example, for transmission through the system to a distant telephone. Such communication information is transferred to data distribution center 20 via switched telephone network 23 using modem 5 shown in FIG. 1 or via cellular telephone transmission facility 27 using cellular telephone 9 shown in FIG. 1. The communication information includes distribution information which is used by data distribution center 20 to route the communication information to the recipient in the most efficient manner. In the case of a voice or facsimile telephone number. If the destination telephone number is connected to the switched telephone network 23, data distribution center routes the communication information to the telephone network via communications path 24 for transfer to the destination telephone. Data distribution center 20 may hold the communication information for later transfer to the recipient.

If the communication information is destined for a second telecomputer device 30, data distribution center 20 consults a stored information filed for information concerning the current geographical location of the second telecomputer 30 and routes the communication information accordingly.

If second telecomputer 30 is located a great distance from first telecomputer 30, the communication information maybe routed through up/down link 21 for transfer via satellite to satellite transmitter/receiver 14 shown in FIG. 1. Telecomputer 30 also may use transmitter/receiver 14 to transmit the communications information directly to the satellite for down linking to up/down link 21 and transfer to data distribution center 20 for routing to the recipient.

While the forgoing describes a preferred embodiment of the present invention, it is to be understood that the invention is not limited thereto. Various alternative embodiments will be readily apparent to one of ordinary skill in the art. The invention is only limited by the claims appended hereto.

What is claimed is:

1. A telecommunications system for providing telecommunications services across national borders to a plurality of system subscribers, said system comprising:

an operations center having means for receiving incoming requests for communications with a selected subscriber and network interface means for coupling said operations center to a digital data network for sending and receiving data signals;

a satellite uplink coupled to said operations center for communicating with an orbiting communications satellite;

a plurality of earth based broadcast stations each having transmission means for broadcasting control signals;

a portable communications terminal adapted to be carried by subscribers of said system, said terminal having receiver means for receiving said control signals and network interface means for coupling said terminal to said digital data network for sending and receiving said data signals;

wherein said operations center responds to a request for communications with said selected subscriber by sending a control signal to said terminal via said communications satellite and said broadcast stations, said control signal activating said terminal to automatically connect to said operations center via said digital data network in order to conduct said requested communication.

2. The telecommunications system of claim 1 wherein said digital data network is packet-switched.

3. The telecommunications system of claim 1 wherein said terminal is a wireless telephone.

4. The telecommunications system of claim 1 wherein said terminal is a laptop computer.

5. The telecommunications system of claim 1 wherein said terminal is a two-way pager.

* * * * *